Feb. 13, 1934. C. G. KELLER 1,947,091
BRAKE
Filed June 28, 1927
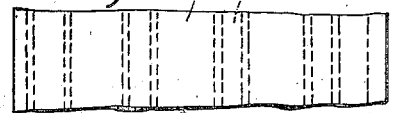
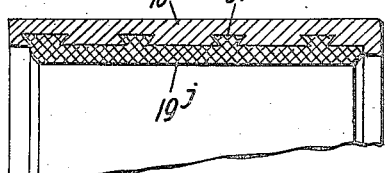
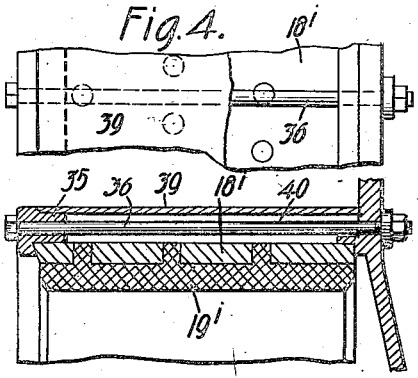
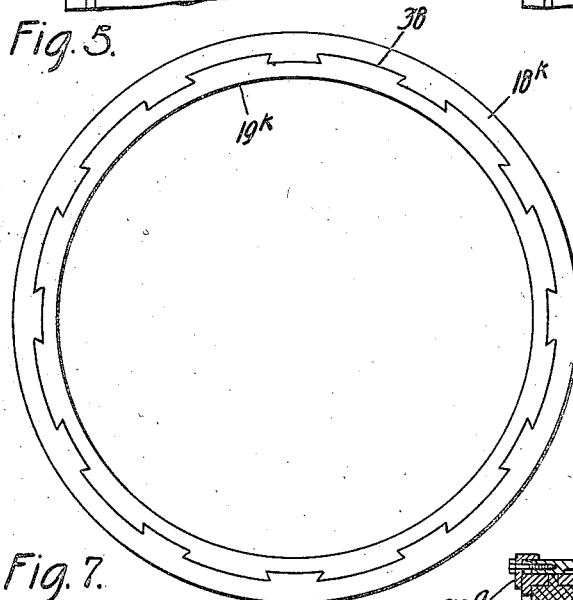
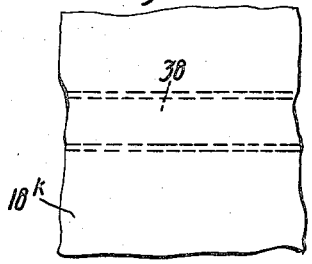
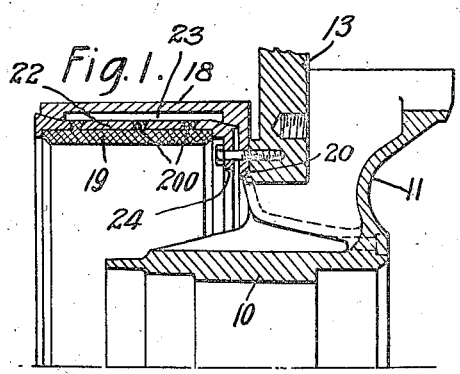
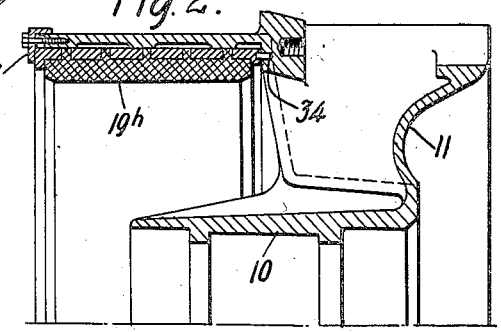
Inventor
Charles G. Keller.
By his Attorneys Patented Feb. 13, 1934

1,947,091

UNITED STATES PATENT OFFICE 1,947,091

BRAKE

Charles G. Keller, Poughkeepsie, N. Y.

Application June 28, 1927. Serial No. 201,990

4 Claims. (Cl. 188—218)

This invention relates to wheels having internal brakes operable to engage the inner surface only of a brake drum attached directly to the wheel. Although certain features of the invention may be utilized in various types of wheels and pullies, the main object is to improve automotive vehicle wheels to better adapt them for heavy duty.

The heat resulting from high friction pressure of the brakes on the ordinary brake drum for a considerable time, for instance, to limit the speed of a heavily loaded vehicle down a long hill or to bring the vehicle to a stop, is very high. In the ordinary vehicle wheel this heat often causes an expansion of the brake drum to such a point that the brake shoes can no longer be forced into proper engagement therewith and the brakes when most needed fail to operate efficiently. Also the heat transmitted from the brake drum to the vehicle tires tends to injure the rubber of the tires so as to very materially shorten the life of the latter.

The main objects of my invention are to prevent or retard transmission of heat to the tires, to prevent the heating of the brake drum to any such extent as will cause objectionable expansion, and to transmit more heat to the brake shoes so as to render the brakes more efficient when most needed.

In carrying out my invention, I provide the brake drum on its inner surface only with a liner of friction material, which is a very poor conductor of heat, with which the metallic heat transmitting surfaces of the brake shoes may directly engage. Thus the heat generated by the engagement of the brake shoes with the brake drum liner is conducted inwardly through the brake shoes and brake rigging, and is thus dissipated. The heat of the brake shoes expands these parts, thereby reducing the clearance between the friction surface of the brake drum and the shoes and as such parts are used within the brake drum the expansion renders the brake shoes more effective after continued use instead of less effective as in the ordinary construction where the friction material is on the brake shoes.

By means of my invention, it is possible to connect the brake directly to the felly or to the outer ends of the spokes closely adjacent to the tire rim or preferably to make it integral with these parts with less radiation of heat to the tires, and with less necessity for the provision of special cooling or heat radiating means.

As a further feature, I preferably provide an air chamber or other insulation space between the brake drum and the friction liner to further retard the flow of heat toward the tires.

In the accompanying drawing, I have illustrated various embodiments of my invention.

In the drawing:

Fig. 1 is an axial section through a brake drum embodying my invention and attached to a portion of a wheel adapted for the supporting of twin tires;

Fig. 2 is a section similar to Fig. 1, but showing another form of brake drum;

Fig. 3 is a sectional detail showing a further form;

Fig. 4 is a view of a portion of the periphery of the construction shown in Fig. 3;

Fig. 5 is a sectional detail showing circumferential dove tail connections between the friction lining and the brake drum;

Fig. 6 is a view of a portion of the periphery of the form shown in Fig. 5;

Fig. 7 is an end view of a brake drum having longitudinal dove tail connections with the liner; and Fig. 8 is a partial face view of the form shown in Fig. 7.

In Fig. 1, I have illustrated my invention as applied to a vehicle wheel in which the hub 10 is cast integral with a plurality of spokes 11 which are U-shaped in cross-section. The wheel is not provided with any felly and rims which may be of any standard type of construction may be secured directly to the outer ends of the spokes. A rim securing means which may be employed with the type of wheel illustrated in the accompanying drawing may be that illustrated in my prior Patent 1,827,790, issued Oct. 20, 1931.

The several bridge pieces or rim supports 13 carry a brake drum 18 which may be of comparatively large diameter and spaced to only a slight distance from the inner rim. This is possible by reason of the fact that the brake drum includes an inner removable rim or sleeve 22 which carries upon its inner surface a liner 19 of friction material which is a poor conductor of heat. Any suitable form of brake shoes may be employed within the brake drum and which when operated expand or move outwardly into engagement with the liner. Very little of the heat produced from the frictional engagement will be transmitted outwardly through the liner 19. Most of the heat will be conducted inwardly through the brake shoes and brake operating mechanism.

I have not shown any brake in Fig. 1 as it will be apparent that any internal type of brake now commonly used may be employed with my improved construction, if the insulation or friction material be removed from such shoes or equivalent braking parts.

I have shown the brake drum 18 provided with an inwardly directed flange 20 which is comparatively narrow and which is bolted directly to the rim supporting part 13. Thus the flange does not interfere with the free circulation of air axially of the wheel past the brake and thence outward radially through the passages in the spokes and between the two tires.

I have illustrated the liner 19 as molded directly into the inner removable sleeve 22 of the brake drum and provided with outwardly extending lugs or projections 200 entering the apertures in the brake drum to give added adhesion surface and to prevent creeping or relative circumferential motion. The edges of the liner may be protected by abutting against shoulders on the sleeve 22.

The sleeve 22 telescopes into the brake drum 18. The two parts 18 and 22 are provided with coacting seat portions at opposite edges so that the body portion of one is spaced from the body portion of the other to leave an air chamber 23 which serves to further prevent the transmission of heat to the brake drum. Both seats may be tapered and the inboard one may be of larger diameter than the one at the outboard side. This insulation space 23 may be filled with asbestos, if desired. The sleeve 22 may have a flange 24 so that the same series of bolts which connect the brake drum to the rim support 13 will also serve to hold the sleeve in place, or the two may be independently secured by separate sets of bolts or other fastening means.

In Fig. 2 I have shown the liner 19h secured to a sleeve similar to that illustrated in Fig. 1. The drum is cast integral with the wheel and an air space is provided as a further aid in preventing transmission of heat through the brake drum to the tire. The air space is in the form of annular grooves in the inner surface of the drum, but such grooves might be made in an axial direction and open at their outer ends. The space might be filled with insulation. The sleeve to which the liner is molded is held by a clamping collar 32g and is held against creeping by pins 34.

In Figs. 3 and 4 the liner 19i is secured to a brake drum 18i by being molded thereto with portions extending into apertures in the brake drum as in Fig. 1, but the brake drum is clamped to the side of the wheel by a collar 35 and tie bolts 36. Instead of molding the lining into apertures in the drum, the liner 19j may be molded into circumferential dove tail grooves 37 in the brake drum 18j as shown in Figs. 5 and 6. The liner 19k may be molded into longitudinally extending dove tail grooves 38 in the brake drum 18k as shown in Figs. 7 and 8. Outside of the row of securing bolts 36, there may be a sleeve 39, spaced from the sleeve 18' so as to leave an insulation space 40 to aid in preventing transmission of heat to the rim of the encircling tire.

It will be obvious that the liner of friction material which is a poor conductor of heat may be secured to the brake drum or brake flange in various other ways which will prevent relative circumferential movement and which will prevent transmission of heat of braking friction to the brake drum.

It will be noted that in my improved construction a larger brake drum may be used than is practical in previous types of construction. There is no brake on the outside of the drum, the only brake being that on the inside. Thus the brake drum may be brought closely adjacent to the tire carrying rim and secured directly to or carried by the metal parts which support the rim. This closed juxtaposition and direct supporting is made by preventing the transfer of heat through the brake drum.

Having thus described my invention, what I claim as new and desire to secure by Letters Patent is:

1. A brake drum comprising an inner rim and an outer rim, the inner rim being spaced concentrically from the outer rim, bolts engaging the outer rim, and means held by said bolts and overlapping the inner rim for securing the inner rim rigidly within the outer rim.

2. A brake drum comprising an inner rim and an outer rim, one of said rims having a flange at its open edge engaging the other rim for spacing the inner rim peripherally from the outer rim, and means for securing the rims together.

3. A brake drum having a body comprising an attaching portion and a cylindrical portion overhung therefrom, said cylindrical portion having interior seat portions of different diameters decreasing toward the inner side, a liner having cooperating seats on its exterior surface and constructed to enter within said cylindrical portion with a clearance between the seats of said liner and of the body respectively, and securing means for holding the liner to said attaching portion and against rotation.

4. A brake drum having a body comprising an attaching portion and a cylindrical portion overhung therefrom, and having interior seat portions of different diameters decreasing toward the inner side, a liner having cooperating seats on its exterior surface and constructed to enter within said cylindrical portion with a clearance between the seats of said liner and of the body respectively, and securing means cooperating with one side edge of the liner and of said body for holding the liner against axial and rotational movements.

CHARLES G. KELLER.